(12) United States Patent
Elgart et al.

(10) Patent No.: US 6,757,336 B1
(45) Date of Patent: Jun. 29, 2004

(54) DEVICE AND METHOD FOR PERFORMING A CARRIER RECOVERY

(75) Inventors: Vladislav Elgart, Rishon (IL); Avishay Moscovici, Tel-Aviv (IL); Gideon Naor, Givat Shmuel (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/564,530

(22) Filed: May 4, 2000

(51) Int. Cl.[7] .................................................. H04L 5/12
(52) U.S. Cl. ...................... 375/261; 375/326; 329/308; 329/325; 329/360; 455/147; 455/214; 455/326
(58) Field of Search ................................. 375/324–327, 375/261, 371; 329/302, 306–308, 323–325, 346, 358–360; 455/147, 208, 214, 326

(56) References Cited

U.S. PATENT DOCUMENTS

| | | | |
|---|---|---|---|
| 4,344,176 A | 8/1982 | Qureshi | 375/15 |
| 5,228,060 A | 7/1993 | Uchiyama | 375/75 |
| 5,940,450 A * | 8/1999 | Koslov et al. | 375/344 |
| 6,009,132 A | 12/1999 | Scholtz | 375/355 |
| 6,307,898 B1 * | 10/2001 | Ido | 375/326 |
| 6,430,243 B1 * | 8/2002 | White | 375/376 |

* cited by examiner

*Primary Examiner*—Stephen Chin
*Assistant Examiner*—Dac V. Ha

(57) ABSTRACT

A method of receiving a signal and performing a carrier recovery, the method comprising the steps of: (a) receiving a signal Xk. (b) rotating Xk by a previous correction angle $\theta k{-}1$ to generate a rotated signal Qk, wherein the rotation is based upon a sine and cosine of the previous correction angle. (c) mapping the rotated signal Qk to a valid decision Ak out of a constellation. (d) generating a normalized error signal $\Delta\theta k,k{-}1$ that reflects an angular difference between a correction angle $\theta k$ and the previous correction angle $\theta k{-}1$. (e) calculating and storing a sine and a cosine of the correction angle $\theta k$, wherein the calculation is based upon $\Delta\theta k,k{-}1$, the sine of the previous correction angle $\theta k{-}1$ and the cosine of the previous correction angle.

9 Claims, 2 Drawing Sheets

-PRIOR ART-

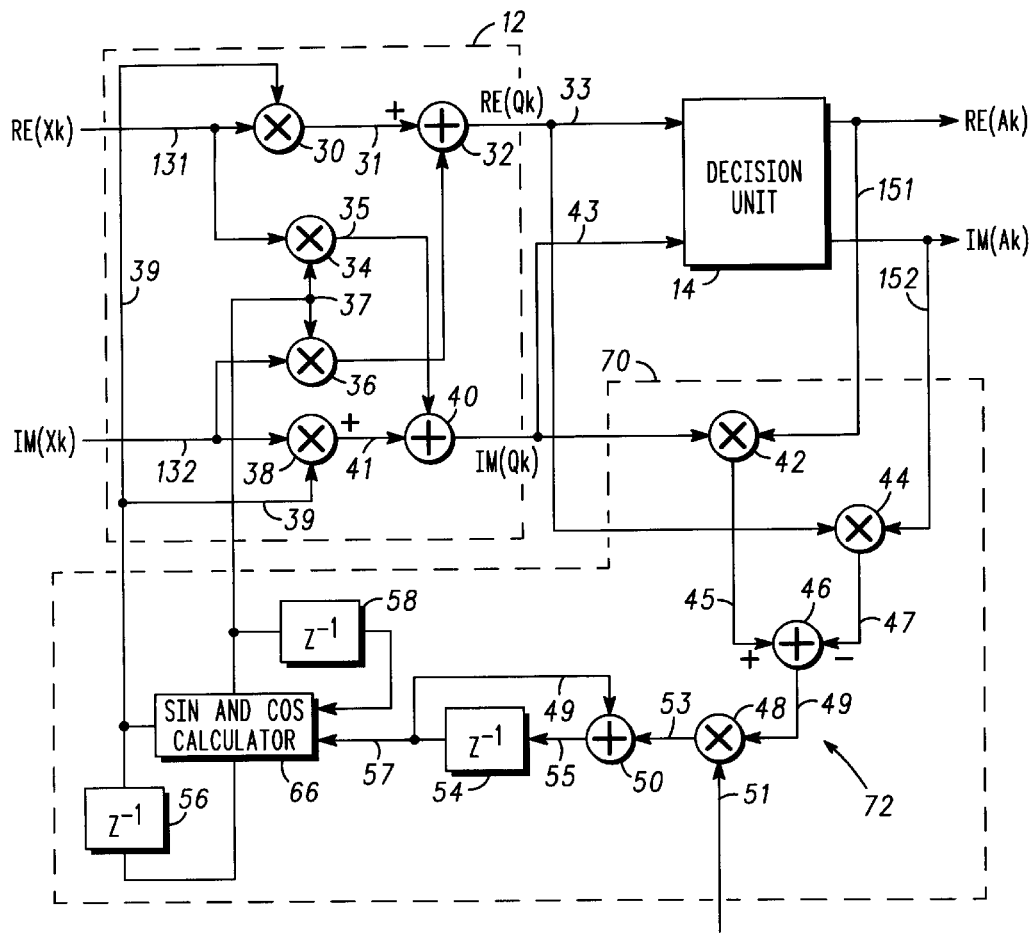
*FIG. 2*
*FIG. 3*
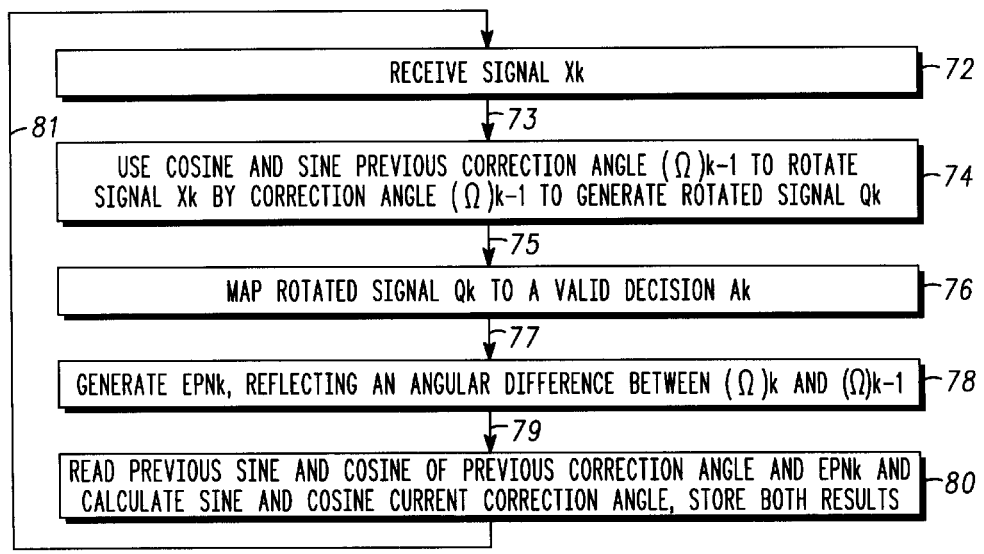

DEVICE AND METHOD FOR PERFORMING A CARRIER RECOVERY

FIELD OF THE INVENTION

A device and method for performing a carrier recovery and especially a device and method for performing carrier recovery by calculating a sine and a cosine of a correction angle and rotating a received signal accordingly.

BACKGROUND OF THE INVENTION

Modems enable information to be transferred over telephone lines or other communication links. A carrier signal is modulated by information and is sent, via a path, from a transmitting modem to a receiving modem. A common method of modulation is the PAM in which both the phase and the amplitude of the carrier signal are modulated. Each modem is characterized by a group of allowable transmitted symbols. This group is commonly known as a constellation.

The carrier signal is generated by a signal generator within the transmitting modem, while the receiving modem has another signal generator, that generates a carrier recovery signal that has a slightly different frequency than the carrier frequency. The frequency variations are compensated by carrier recovery systems.

A prior art carrier recovery circuits comprise of a multiplexer, a decision unit that maps a signal inputted to it to a symbols of the constellation, an angle difference detector that measures the angular difference between the inputted signal and the symbol; a loop filter that receives the difference and provides an error signal to a complex voltage controlled oscillator VCO, the complex VCO provides a shift signal to be provided to the multiplexing unit so that a signal that is inputted to the multiplexer is phase shifted.

A prior art carrier recovery system 10 is shown in FIG. 1. System 10 comprising: multipliers 34, 36, 38, 42, 44 and 48, adders 32, 40, 46 and 50, decision unit 14, delay unit 52 and sine and cosine calculator 62. A multiplying unit 12 is comprised of multipliers 30, 34, 36, 38 and adders 32 and 40.

Multiplying unit 12 receives a real part of a received signal RE(Xk) and an imaginary part of a received signal IM(Xk) and multiplies them by an estimation of the phase shift provided by sine and cosine calculator 62. A real and imaginary parts of the product RE(Qk) and IM(Qk) are provided to decision unit 14. Decision unit 14 maps Qk to a symbol of the constellation Ak. A real part RE(Ak) and an imaginary part IM(Ak) of Ak, RE(Qk) and IM(Qk) are provided to multipliers 42 and 44 and adder 46 to produce an error signal EPk. Error signal EPk is passed through a loop filter comprising of multiplier 48 adder 50 and delay unit 52 to produce a normalized error signal EPNk. EPNk is provided to sine and cosine calculator 62 which receives EPNk provides it to an integrating circuit within sine and cosine calculator 62. The integrating circuit outputs a correction angle θk that reflects an angular difference between Ak and Xk, calculates the sine and cosine COS(θk) and SIN(θk) of θk and provides them to multiplying unit 12 in a manner that rotates a next signal Xk+1 by θk to produce Qk+1.

Multiplier 30 has two inputs and an output for receiving RE(Xk) and COS(θk−1) and providing a first product RES_30 to adder 32. Multiplier 38 has two inputs and an output for receiving IM(Xk) and COS(θk−1) and providing a fourth product RES_38 to adder 40. Multiplier 34 has two inputs and an output for receiving RE(Xk) and SIN(θk−1) and providing a second product RES_34 to adder 40. Multiplier 36 has two inputs and an output for receiving IM(Xk) and SIN(θk−1) and providing a third product RES_36 to adder 32. Adder 32 has two inputs and an output for receiving RES_36 and RES_30 and provide RE(Qk) to decision unit 14 and to multiplier 44. Adder 40 has two inputs and an output for receiving RES_38 and RES_34 and providing a IM(Qk) to multiplier 42 and to decision unit 14. Decision unit 14 outputs RE(Ak) and provides it to multiplier 42. Decision unit 14 outputs IM(Ak) and provides it to multiplier 44. Multiplier 42 receives RE(Qk) and IM(Ak) and provides a fifth product RES_42. Multiplier 44 receives IM(Qk) and RE(Ak) and provides a sixth product RES_44. Adder 46 subtracts RES_44 from RES_42 and provides error signal EPk.

Correction angle θk ranges between 0 to 2π. Prior art sine and cosine unit 64, either implemented in software or hardware, calculated COS(θk) and SIN(θk) by either a look up table or by calculating a Taylor series representing either COS(θk) and SIN(θk). Both solutions offered a relatively poor compromise between accuracy and either complexity or memory space. For example, if the system is implemented by a 16-bit processor, the table will have to up till $2^{16}$ entries to provide an accuracy of $\pi/2^{16}$ degrees, which is not good enough.

There is a need to provide an improved device and method for performing carrier recovery, so that the calculation of a sine and a cosine of a correction angle is both accurate and simple.

BRIEF DESCRIPTION OF THE DRAWINGS

While the invention is pointed out with particularity in the appended claims, other features of the invention are disclosed by the following detailed description taken in conjunction with the accompanying drawings, in which:

FIG. 2 is a schematic description of a carrier recovery system according to a preferred embodiment of the invention; and FIG. 3 is a flow chart diagram of a method for performing carrier recovery, according to a preferred embodiment of the invention.

DETAILED DESCRIPTION OF THE DRAWINGS

Figure 1:
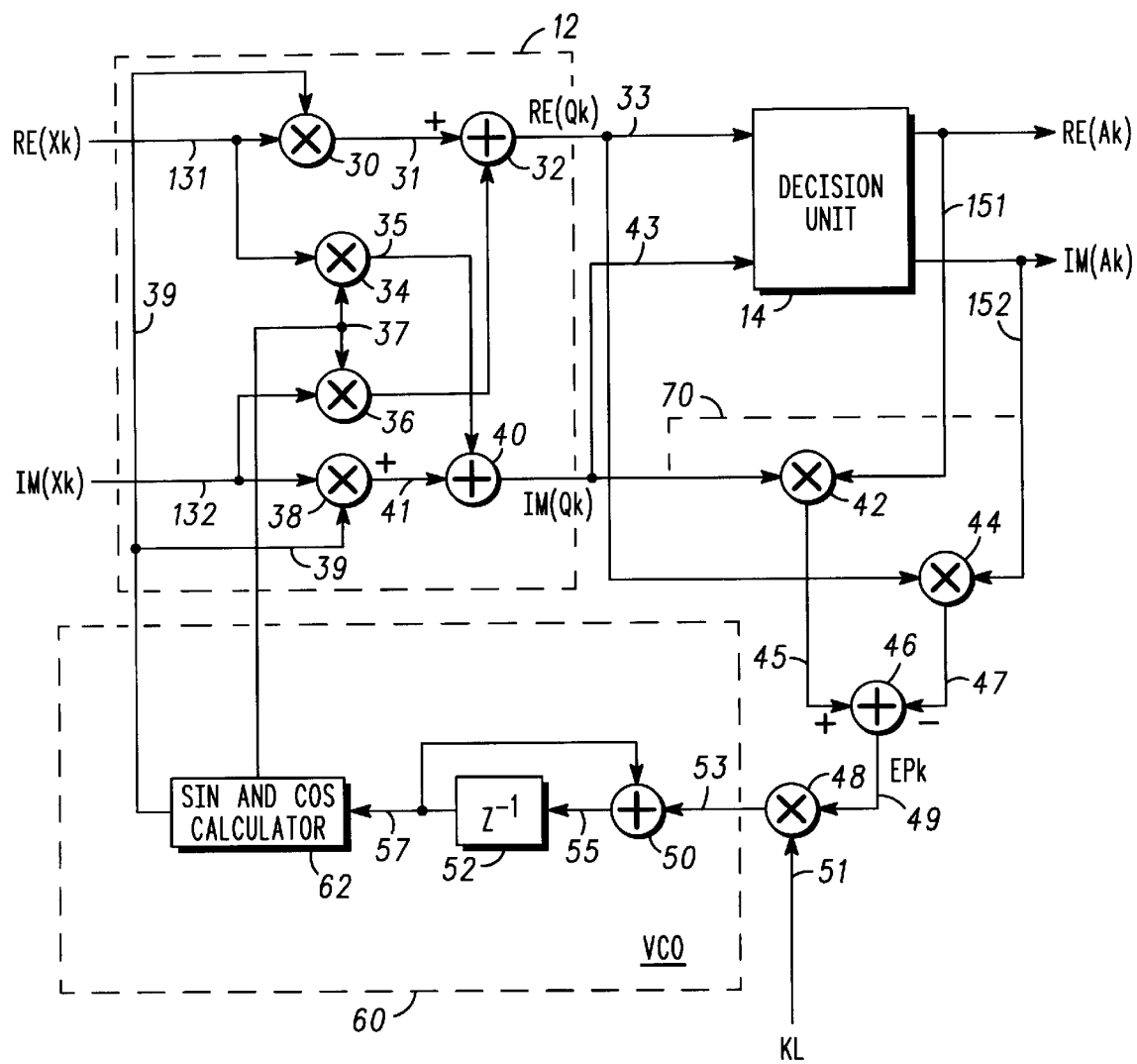
FIG. 1 is a schematic description of a prior art carrier recovery system.

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a device and method for performing carrier recovery that involves the calculation of a sine and a cosine of a correction angle θk in a carrier recovery circuit. The calculation is based upon a difference Δθk,k−1 between a previous correction angle θk−1 and the correction angle θk. The difference Δθk,k−1 is very small so that the SIN(Δθk,k−1) substantially equals Δθk,k−1 and COS(Δθk, k−1) substantially equals 1. SIN(θk) and COS(θk) are calculated by implementing the following equations: COS(θk)=COS(θk−1)−SIN(θk−1)* (Δθk,k−1). SIN(θk)=COS(θk−1)*(Δθk,k−1)+SIN(θk−1).

The invention provides a system for performing carrier loop recovery, the carrier loop recovery involves the calculation of a sine and a cosine of a correction angle, the system comprising: a multiplying unit, for rotating a received signal Xk by a previous correction angle θk−1 to produce a rotated signal Qk; wherein the rotation is based upon a sine and a cosine of the previous correction angle θk−1; a decision unit, coupled to the multiplying unit, for mapping Qk to a symbol Ak of the constellation Ak, and for providing Ak; and a correction angle generating unit, coupled to the decision unit and to the multiplying unit, for receiving symbol Ak, rotated signal Qk; wherein the correction angle generator stores a sine and a cosine of the previous correction angle θk−1; wherein the correction angle generator generates and stores a sine and a cosine of a correction angle θk.

Referring to FIG. 2, system 20 comprising: correction angle generation unit 70, multiplying unit 12, and decision unit 14. Correction angle generation unit 70 comprising delta calculation unit 72, sine and cosine calculator 66, delay units 56 and 58. Delta calculating unit 72 comprising multipliers 42, 44 adder 46 and a loop filter. The loop filter is conveniently comprised of multiplier 48 adder 50 and delay unit 54. Multiplying unit 12 is comprised of multipliers 30, 34, 36, 38 and adders 32 and 40. Multiplying unit 12 receives a real part of a received signal RE(Xk) and an imaginary part of a received signal IM(Xk) and multiplies then by an estimation of the phase shift provided by sine and cosine calculator 62. A real and imaginary parts of the product RE(Qk) and IM(Qk)are provided to decision unit 14. Decision unit 14 maps Qk to a symbol of the 25 constellation Ak. A real RE(Ak) and an imaginary IM(Ak) parts of Ak and RE(Qk) and IM(Qk) are provided to multipliers 42 and 44 and adder 46 to produce an error signal EPk. Error signal EPk is passed through a loop filter comprising of multiplier 48 adder 50 and delay unit 54 to produce a normalized error signal $\Delta\theta k,k-1$ that reflects the difference between the correction angle θk and the previous correction angle θk−1. $\Delta\theta k,k-1$ is provided to sine and cosine calculator 66.

Sine and cosine calculator 66 has an outputs 661 and 662 for providing a sine and cosine COS(θk) and SIN(θk) of correction angle θk. COS(θk) and SIN(θk) are provided to delay units 56 and 58 to be provided to sine and cosine calculator 66 during the calculation of the next correction angle θk+1. When θk is calculated the previous correction angle θk−1 is provided to sine and cosine calculator 66 by delay units 56 and 58.

The difference $\Delta\theta k,k-1$ between a correction angle θk and the previous correction angle is very small. For example, ITU standard V0.34 limits the difference between the carrier signal frequency and the recovery signal frequency to 0.02% of 3420Hertz.

Sine and cosine calculator 66 calculates COS(θk) by implementing the following equations:

(1) COS(θk)=COS(θk−1+Δθk,k−1)=COS(θk−1)*COS(Δθk,k−1)−SIN(θk−1)*SIN(Δθk,k−1)

(2) SIN(θk)=SIN(θk−1+Δθk,k−1)=COS(θk−1)*SIN(Δθk,k−1)+SIN(θk−1)*COS(Δθk,k−1) Because (Δθk,k−1) is very small then:

(3) SIN(Δθk,k−1) substantially equals (Δθk,k−1).

(4) COS(Δθk,k−1) substantially equals 1. If we apply equations (3) and (4) to equations (1) and (2) we get:

(5) COS(θk)=COS(θk−1)−SIN(θk−1)* (Δθk,k−1).

(6) SIN(θk)=COS(θk−1)*(Δθk,k−1)+SIN(θk−1)

Sine and cosine calculator 66 calculates is provided with (Δθk,k−1), COS(θk−1) and SIN(θk−1) from delay units 54, 56 and 58 so that the calculation of both COS(θk) and SIN(θk) involve only two multiplications and two additions. This can be implemented in hardware by two simple adders and multipliers. The software implementation is also very simple and fast.

The inventor implemented equations (1) and (2) to equations (5) and (6) on a 16-bit processor and found no difference between the results given by implementing either former or latter equations. The estimations of equations (5) and (6) provide an accuracy of more than $2^{-16}$.

FIG. 3 is a simplified flow chart diagram illustrating method 70 of the present invention. Preferably, method 70 comprises steps 72, 74, 76, 78 and 80, all steps illustrated by blocks. Solid lines 73, 75, 77, 79 and 81 couple step 72 to step 74, step 74 to step 76, step 76 to step 78, step 78 to step 80 and step 80 to step 72, accordingly. These lines and boxes indicate a preferred method flow.

Method 70 starts by step 72 receiving a signal Xk. Conveniently, step 72 involves receiving a real part RE(Xk) of Xk and an imaginary part IM(Xk) of Xk.

Step 72 is followed by step 74 of rotating Xk by a previous correction angle θk−1 that was calculated during a previous cycle and generating rotated signal Qk. Conveniently, the rotation is done by a set of multiplications and summations between RE(Xk), IM(Xk) and a sine SIN(θk−1) and a cosine COS(θk−1) of the previous correction angle θk−1.

Step 74 is followed by step 76 of mapping rotated signal Qk to a valid decision Ak out of the constellation. Conveniently, Ak has real RE(Ak) and imaginary IM(Ak) parts.

Step 76 is followed by step 78 of generating a normalized error signal EPNk that reflects an angular difference between correction angle θk and a previous correction angle θk−1. Conveniently, the generation of EPNk is done by multiplying RE(Qk) by IM(Ak), multiplying IM(QK) by RE(Ak), subtracting the first product from the second product and passing the result through a loop filter. Preferably, this result is multiplied by a constant K1 and is passed through a first order infinite impulse response filter.

Step 78 is followed by step 80 of reading sine SIN(θk−1) and cosine COS(θk−1) of previous correction angle θk−1 and EPNk, generating and storing sine SIN(θk) and cosine COS(θk) of correction angle θk. Both are to be used during a next iteration of method 70. Step 80 is followed by step 72.

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of a device and method for performing carrier recovery.

It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

We claim:

1. A method of receiving a signal and performing a carrier recovery, the method comprising the steps of:
   (a) receiving a signal Xk;
   (b) rotating Xk by a previous correction angle θk−1 to generate a rotated signal Qk, wherein the rotation is based upon a sine and cosine of the previous correction angle;
   (c) mapping the rotated signal Qk to a valid decision Ak out of a constellation;
   (d) generating a normalized error signal Δθk,k−1 that reflects an angular difference between a correction angle θk and the previous correction angle θk−1; and
   (e) calculating and storing a sine and a cosine of the correction angle θk, wherein the calculation is based upon Δθk,k−1, the sine of the previous correction angle θk−1 and the cosine of the previous correction angle and wherein the sine of the correction angle θk is calculated by adding the sine of the previous correction angle θk−1 to a product of a multiplication of the cosine of the previous correction angle θk−1 and Δθk,k−1 or the cosine of the correction angle θk is calculated by subtracting from the cosine of the previous correction angle θk−1 a product of a multiplication of the sine of the previous correction angle θk−1 and Δθk,k−1.

2. The method of claim 1 wherein the step (b) comprising the sub-steps of:
   (1) multiplying a real part of Xk by the cosine of the previous correction angle θk−1 to generate a first product; multiplying the real part of Xk by the sines of the previous correction angle θk−1 to generate a second product; multiplying an imaginary part of Xk by the sines of the previous correction angle θk−1 to generate a third product; multiplying the imaginary part of Xk by the sines of the previous correction angle θk−1 to generate a fourth product; and
   (2) adding the first and third products to generate a real part of the rotated signal Qk; adding the second and fourth products to generate an imaginary part of the rotated signal Qk.

3. The method of claim 1 wherein step (d) involves the steps of:
   multiplying a real part of Qk and an imaginary part of Ak to generate a fifth product;
   multiplying an imaginary part of Qk and a real part of Ak to generate a sixth product;
   subtracting the sixth product from the fifth product to generate an error signal; and
   providing the error signal to a loop filter that outputs the normalized error signal Δθk,k−1.

4. The method of claim 3 wherein the loop filter multiplies the error signal by a constant K1 and passed the product through an infinite impulse response filter an adder and a multiplier.

5. A system for performing carrier loop recovery, the carrier loop recovery involves the calculation of a sine and a cosine of a correction angle, the system comprising:
   a multiplying unit, for rotating a received signal Xk by a previous correction angle θk−1 to produce a rotated signal Qk; wherein the rotation is based upon a sine and a cosine of the previous correction angle θk−1;
   a decision unit, coupled to the multiplying unit, for mapping Qk to a symbol Ak of the constellation Ak, and for providing Ak; and
   a correction angle generating unit, coupled to the decision unit and to the multiplying unit, for receiving symbol Ak, rotated signal Qk; wherein the correction angle generator stores a sine and a cosine of the previous correction angle θk−1; wherein the correction angle generator generates and stores a sine and a cosine of a correction angle θk, the sine of the correction angle θk being calculated by adding the sine of the previous correction angle θk−1 to a product of a multiplication of the cosine of the previous correction angle θk−1 and Δθk,k−1 or the cosine of the correction angle θk being calculated by subtracting from the cosine of the previous correction angle θk−1 a product of a multiplication of the sine of the previous correction angle θk−1 and Δθk,k−1.

6. The system of claim 5 wherein the calculation of the sine and the cosine of the correction angle θk is based upon Δθk,k−1, the sine of the previous correction angle θk−1 and the cosine of the previous correction angle.

7. The system of claim 6 wherein the system receives a real part of the received signal Xk and an imaginary part of the received signal Xk.

8. The system of claim 7 wherein the correction angle generator comprises of:
   a delta calculation unit, for calculating a normalized error signal Δθk,k−1 that reflects an angular difference between a correction angle θk and the previous correction angle θk−1; and
   a sine and cosine calculator, the sine and cosine generator receives Ak, rotated signal Qk, a sine and a cosine of the previous correction angle θk−1 and Δθk,k−1, and for calculating the sine of the correction angle θk by adding the sine of the previous correction angle θk−1 to a product of a multiplication of the cosine of the previous correction angle θk−1 and Δθk,k−1.

9. The system of claim 8 wherein the sine and cosine calculator calculates the cosine of the correction angle θk by subtracting from the cosine of the previous correction angle θk−1 a product of a multiplication of the sine of the previous correction angle θk−1 and Δθk,k−1.

* * * * *